US012737800B2

(12) United States Patent
Aidan

(10) Patent No.: US 12,737,800 B2
(45) Date of Patent: Sep. 15, 2026

(54) DIGITAL TECHNIQUES FOR MANAGING COSMETICS AND SKINCARE PRODUCT USAGE

(71) Applicant: ELC MANAGEMENT LLC, Melville, NY (US)

(72) Inventor: Christopher Aidan, Austin, TX (US)

(73) Assignee: ELC MANAGEMENT LLC, Melville, NY (US)

( * ) Notice: Subject to any disclaimer, the term of this patent is extended or adjusted under 35 U.S.C. 154(b) by 195 days.

(21) Appl. No.: 18/761,800

(22) Filed: Jul. 2, 2024

(65) Prior Publication Data

US 2026/0010936 A1 Jan. 8, 2026

(51) Int. Cl.
*G06Q 30/00* (2023.01)
*G06Q 30/0601* (2023.01)
*G06V 40/16* (2022.01)

(52) U.S. Cl.
CPC ....... *G06Q 30/0631* (2013.01); *G06V 40/168* (2022.01)

(58) Field of Classification Search
CPC ................................................ G06Q 30/06–08
See application file for complete search history.

(56) References Cited

U.S. PATENT DOCUMENTS

2019/0095853 A1* 3/2019 Kaplan .................. B65D 25/00
2019/0213227 A1* 7/2019 Ludwinski ........... A61B 5/0077
2020/0387942 A1* 12/2020 Kreuzer ................ H04L 67/306
2023/0187055 A1* 6/2023 Dissanayake .......... G16H 50/30 705/2
2025/0259053 A1* 8/2025 Phatak ................... G06N 3/045

OTHER PUBLICATIONS

Akshya, J., "EfficientNet-based Expert System for Personalized Facial Skincare Recommendations", 2023 7th Int'l Conf. on Intelligent Computing and Control Systems 979-8-3503-9725-3/23, pp. 1151-1156, Mar. 2023 (Year: 2023).*

* cited by examiner

*Primary Examiner* — Ethan D Civan
(74) *Attorney, Agent, or Firm* — MARSHALL, GERSTEIN & BORUN LLP

(57) ABSTRACT

Computer implemented methods and systems are provided. Such systems and methods include inputting at least a portion of received user data indicative of at least a plurality of unique face and/or skin characteristics into a trained artificial intelligence module. The trained artificial intelligence module is trained using historical data inputs that are associated with known face and/or skin characteristics. Execution of the trained artificial intelligence module may identify the plurality of unique face and/or skin characteristics from the user data and cosmetic and/or skincare products contained in a database. At least one personalized recommendation may then be generated based on the plurality of unique face and/or skin characteristics identified by the trained artificial intelligence module. The at least one personalized recommendation may be for one of the cosmetic and/or skincare products contained in the database and include associated usage guidelines.

13 Claims, 8 Drawing Sheets

DIGITAL TECHNIQUES FOR MANAGING COSMETICS AND SKINCARE PRODUCT USAGE

FIELD

The present disclosure relates generally to systems and methods for managing cosmetics and skincare product usage, and more particularly to systems and methods that employ artificial intelligence and/or machine learning processes and a comprehensive database of cosmetics products to generate hyper-personalized product recommendations and usage guidelines for a specific end user from user data unique to the end user.

BACKGROUND

Cosmetics and skincare products have traditionally been selected by end users based on subjective factors such as personal user preference, product marketing claims, and perceived effectiveness by the user. However, this traditional approach fails to consider unique user data such as unique face and/or skin characteristics of the end user and/or environmental factors associated with the end user's primary location. Furthermore, the traditional approach also involves trial and error and/or reliance on general recommendations for identifying usage guidelines for selected cosmetic and/or skincare products, but this approach does not always provide optimal results for individual users.

Additionally, current technological solutions for generating personalized product recommendations are inadequate because such solutions are forced to rely on hard coded correlations between various databases entries, which can produce inaccurate and/or non-comprehensive results. In particular, these systems rely on the subjective user input data rather than reliable, consistent, and objective data entries about a user's face and/or skin characteristics that are extracted in a programmatic manner from user provide video and/or still images. Furthermore, these systems are unable to sufficiently process and normalize the whole scope of the subjective user data (e.g., user outcome preferences, user descriptions of facial features, etc.) because such systems are typically designed to identify matching keywords for recalling database entries that include manually correlated product recommendations and/or utilize multiple choice or yes/no questions to limit the processable user data into a format suitable for looking up the manually corelated database entries.

With the increasing availability of digital technologies and the growing demand for personalized beauty solutions, there is a need for a system that can take into account all of a user's unique characteristics and offer tailored cosmetics and skincare recommendations and usage guidelines based on personalized data to produce more effective and consistent outcomes.

SUMMARY

In some aspects, the techniques described herein relate to a computer implemented method for generating personalized cosmetic and/or skincare product recommendations and usage guidelines, the method including: receiving user data at one or more processors, the user data being indicative of at least a plurality of unique face and/or skin characteristics associated with an individual user; inputting, via the one or more processors, at least a portion of the user data into a trained artificial intelligence module, the trained artificial intelligence module being trained using historical data inputs that are associated with known face and/or skin characteristics; identifying, via execution of the trained artificial intelligence module by the one or more processors, the plurality of unique face and/or skin characteristics from the user data input by the one or more processors; generating, via the one or more processors, at least one personalized recommendation based on the plurality of unique face and/or skin characteristics identified by the trained artificial intelligence module from the user data and cosmetic and/or skincare products contained in a database, the at least one personalized recommendation being for one of the cosmetic and/or skincare products contained in the database and including associated usage guidelines; and transmitting a notification of the at least one personalized recommendation for display on a user device.

In some aspects, the techniques described herein relate to a computer implemented method, wherein the trained artificial intelligence module is a first trained artificial intelligence module, wherein the historical data inputs are first historical data inputs, and wherein generating the at least one personalized recommendation based on the plurality of unique face and/or skin characteristics identified by the trained artificial intelligence module from the user data and the cosmetic and/or skincare products contained in the database includes: receiving, via the one or more processors, the plurality of unique face and/or skin characteristics as an output from the first trained artificial intelligence module; retrieving, via the one or more processors, an initial set of cosmetic and/or skincare products from the database based at least in part on the plurality of unique face and/or skin characteristics output from the first trained artificial intelligence module; inputting, via the one or more processors, the output from the first trained artificial intelligence module and the initial set of cosmetic and/or skincare products retrieved from the database into a second trained artificial intelligence module, the second trained artificial intelligence module being trained using second historical data inputs that are associated with known product recommendations and known usage guidelines; and receiving, via the one or more processors, the at least one personalized recommendation as an output from the second trained artificial intelligence module.

In some aspects, the techniques described herein relate to a computer implemented method, wherein training the first trained artificial intelligence module includes: iteratively inputting, via the one or more processors, the first historical data inputs into an initial artificial intelligence module, the first historical data inputs including one or more images of skin and faces having the known face and/or skin characteristics; iteratively receiving, via the one or more processors, training outputs from the initial artificial intelligence module, the training outputs including face and/or skin characteristics extracted by the initial artificial intelligence module from the first historical data inputs; iteratively updating, via the one or more processors, the initial artificial intelligence module based on comparisons between the training outputs and the known face and/or skin characteristics through multiple iterations; and storing, via the one or more processors, the initial artificial intelligence module in a memory as the first trained artificial intelligence module when the training outputs match the known face and/or skin characteristic in accordance with a reliability threshold, the reliability threshold being a threshold percentage number of the training outputs that match the known face and/or skin characteristics.

In some aspects, the techniques described herein relate to a computer implemented method, wherein training the second trained artificial intelligence module includes: iteratively inputting, via the one or more processors, the second historical data inputs into an initial artificial intelligence module, the second historical data inputs including pluralities of historical face and/or skin characteristics, historical sets of cosmetic and/or skincare products, and the known product recommendations and known usage guidelines; iteratively receiving, via the one or more processors, training outputs from the initial artificial intelligence module, the training outputs including product recommendations and associated usage guidelines identified by the initial artificial intelligence module from the second historical data inputs; iteratively updating, via the one or more processors, the initial artificial intelligence module based on comparisons between the training outputs and the known product recommendations and known usage guidelines; and storing, via the one or more processors, the initial artificial intelligence module in a memory as the second trained artificial intelligence module when the training outputs match the known product recommendations and known usage guidelines in accordance with a reliability threshold, the reliability threshold being a threshold percentage number of the training outputs that match the known product recommendations and known usage guidelines.

In some aspects, the techniques described herein relate to a computer implemented method, further including: receiving, at the one or more processors, user feedback regarding the at least one personalized recommendation; and updating the second trained artificial intelligence module based on the feedback.

In some aspects, the techniques described herein relate to a computer implemented method, wherein the trained artificial intelligence module is further trained using additional historical data inputs that are associated with known product recommendations and known usage guidelines, and wherein generating the at least one personalized recommendation based on the plurality of unique face and/or skin characteristics identified by the trained artificial intelligence module from the user data and the cosmetic and/or skincare products contained in the database includes: querying the database via the trained artificial intelligence module; and receiving, via the one or more processors, the at least one personalized recommendation as an output from the trained artificial intelligence module.

In some aspects, the techniques described herein relate to a computer implemented method, further including: receiving, at the one or more processors, user feedback regarding the at least one personalized recommendation; and updating the trained artificial intelligence module based on the feedback.

In some aspects, the techniques described herein relate to a computer implemented method, wherein the user data includes one or more of data indicative of a user's current face and/or skin characteristics, face and/or skin preferences received as user input, a user's location, currently used cosmetic and/or skincare products, and usage trends for the currently used cosmetic and/or skincare products and wherein portions of the user data are received from smart packaging devices, smart mirrors, fitness trackers, and environmental sensors.

In some aspects, the techniques described herein relate to a computer implemented method, wherein the data indicative of the usage trends for the currently used cosmetic and/or skincare products includes data received from smart packaging devices for the currently used cosmetic and/or skincare products, the data received from smart packaging devices monitoring use of the currently used cosmetic and/or skincare products over time, expiration dates of the currently used cosmetic and/or skincare products, and storage conditions of the currently used cosmetic and/or skincare products.

In some aspects, the techniques described herein relate to a computer implemented method, wherein the data indicative of the user's current face and/or skin characteristics includes one or multiple images of the user's face and/or skin, wherein the portion of the user data input into the trained artificial intelligence module includes the one or multiple images, wherein the trained artificial intelligence module identifies the plurality of unique face and/or skin characteristics from the one or multiple images of the user's face and/or skin, and wherein the historical data inputs include one or more images of skin and faces having the known face and/or skin characteristics.

In some aspects, the techniques described herein relate to a computer implemented method, wherein the historical data inputs are first historical data inputs, the trained artificial intelligence module is a first trained artificial intelligence module, and wherein generating the at least one personalized recommendation based on the plurality of unique face and/or skin characteristics identified by the trained artificial intelligence module from the user data and the cosmetic and/or skincare products contained in the database includes: receiving, via the one or more processors, the plurality of unique face and/or skin characteristics as an output from the first trained artificial intelligence module based upon the one or more images; retrieving, via the one or more processors, an initial set of cosmetic and/or skincare products from the database based at least in part on the plurality of unique face and/or skin characteristics output from the first trained artificial intelligence module based upon the one or more images and the face and/or skin preferences received as user input; inputting, via the one or more processors, the output from the first trained artificial intelligence module, the initial set of cosmetic and/or skincare products retrieved from the database, the face and/or skin preferences received as user input, the user's location, the currently used cosmetic and/or skincare products, and the usage trends for the currently used cosmetic and/or skincare products into a second trained artificial intelligence module, the second trained artificial intelligence module being trained using second historical data inputs that are associated with known product recommendations and known usage guidelines; and receiving, via the one or more processors, the at least one personalized recommendation as an output from the second trained artificial intelligence module.

In some aspects, the techniques described herein relate to a computer implemented method, wherein the user device is a first user device, and further including: receiving, at the one or more processors, a plurality of images of the user's face and/or skin during a time period when the recommended cosmetic and/or skincare product was being used; inputting, via the one or more processors, the plurality of images into the trained artificial intelligence module; receiving, via the one or more processors, a plurality of additional face and/or skin characteristics extracted from the plurality of images as an output from the trained artificial intelligence module based upon the one or more images; comparing changes in the plurality of additional face and/or skin characteristics output from the trained artificial intelligence module over time to expected changes over time from use of the recommended cosmetic and/or skincare product; and transmitting a second notification documenting deviations from the expected changes over time for display on a second user device different from the first user device.

In some aspects, the techniques described herein relate to a computing system for generating personalized cosmetic and/or skincare product recommendations and usage guidelines, the computing system including: one or more processors; and one or memories having stored thereon computer-executable instructions that, when executed by the one or more processors, cause the computing system to: receive user data at one or more processors, the user data being indicative of at least a plurality of unique face and/or skin characteristics associated with an individual user; input at least a portion of the user data into a trained artificial intelligence module, the trained artificial intelligence module being trained using historical data inputs that are associated with known face and/or skin characteristics; identify, via execution of the trained artificial intelligence module, the plurality of unique face and/or skin characteristics from the user data input by the one or more processors; generate at least one personalized recommendation based on the plurality of unique face and/or skin characteristics identified by the trained artificial intelligence module from the user data and cosmetic and/or skincare products contained in a database, the at least one personalized recommendation being for one of the cosmetic and/or skincare products contained in the database and including associated usage guidelines; and transmit a notification of the at least one personalized recommendation for display on a user device.

In some aspects, the techniques described herein relate to a computing system, wherein the trained artificial intelligence module is a first trained artificial intelligence module, wherein the historical data inputs are first historical data inputs, and wherein to generate the at least one personalized recommendation, the instructions cause the computing system to: receive the plurality of unique face and/or skin characteristics as an output from the first trained artificial intelligence module; retrieve an initial set of cosmetic and/or skincare products from the database based at least in part on the plurality of unique face and/or skin characteristics output from the first trained artificial intelligence module; input the output from the first trained artificial intelligence module and the initial set of cosmetic and/or skincare products retrieved from the database into a second trained artificial intelligence module, the second trained artificial intelligence module being trained using second historical data inputs that are associated with known product recommendations and known usage guidelines; and receive the at least one personalized recommendation as an output from the second trained artificial intelligence module.

In some aspects, the techniques described herein relate to a computing system, wherein to train the first trained artificial intelligence module, the instructions cause the computing system to: iteratively input the first historical data inputs into an initial artificial intelligence module, the first historical data inputs including one or more images of skin and faces having the known face and/or skin characteristics; iteratively receive training outputs from the initial artificial intelligence module, the training outputs including face and/or skin characteristics extracted by the initial artificial intelligence module from the first historical data inputs; iteratively update the initial artificial intelligence module based on comparisons between the training outputs and the known face and/or skin characteristics through multiple iterations; and store the initial artificial intelligence module in a memory as the first trained artificial intelligence module when the training outputs match the known face and/or skin characteristic in accordance with a reliability threshold, the reliability threshold being a threshold percentage number of the training outputs that match the known face and/or skin characteristic.

In some aspects, the techniques described herein relate to a computing system, wherein to train the second trained artificial intelligence module, the instructions cause the computing system to: iteratively inputting, via the one or more processors, the second historical data inputs into an initial artificial intelligence module, the second historical data inputs including pluralities of historical face and/or skin characteristics, historical sets of cosmetic and/or skincare products, and the known product recommendations and known usage guidelines; iteratively receiving, via the one or more processors, training outputs from the initial artificial intelligence module, the training outputs including product recommendations and associated usage guidelines identified by the initial artificial intelligence module from the second historical data inputs; iteratively updating, via the one or more processors, the initial artificial intelligence module based on comparisons between the training outputs and the known product recommendations and known usage guidelines; and saving, via the one or more processors, the initial artificial intelligence module in a memory as the second trained artificial intelligence module when the training outputs match the known product recommendations and known usage guidelines in accordance with a reliability threshold, the reliability threshold being a threshold percentage number of the training outputs that match the known product recommendations and known usage guidelines.

In some aspects, the techniques described herein relate to a computing system, wherein the trained artificial intelligence module is further trained using additional historical data inputs that are associated with known product recommendations and known usage guidelines, and wherein to generate the at least one personalized recommendation, the instructions cause the computing system to: query the database via the trained artificial intelligence module; and receive the at least one personalized recommendation as an output from the trained artificial intelligence module.

In some aspects, the techniques described herein relate to a non-transitory computer-readable medium having stored thereon computer-executable instructions that, when executed, cause one or more processors to: receive user data indicative of at least a plurality of unique face and/or skin characteristics associated with an individual user; input at least a portion of the user data into a trained artificial intelligence module, the trained artificial intelligence module being trained using historical data inputs that are associated with known face and/or skin characteristics; identify, via execution of the trained artificial intelligence module, the plurality of unique face and/or skin characteristics from the user data input by the one or more processors; generate at least one personalized recommendation based on the plurality of unique face and/or skin characteristics identified by the trained artificial intelligence module from the user data and cosmetic and/or skincare products contained in a database, the at least one personalized recommendation being for one of the cosmetic and/or skincare products contained in the database and including associated usage guidelines; and transmit a notification of the at least one personalized recommendation for display on a user device.

In some aspects, the techniques described herein relate to a non-transitory computer-readable medium, wherein the trained artificial intelligence module is a first trained artificial intelligence module, wherein the historical data inputs are first historical data inputs, and wherein to generate the at least one personalized recommendation, the instructions further cause the one or more processors to: receive the plurality of unique face and/or skin characteristics as an output from the first trained artificial intelligence module; retrieve an initial set of cosmetic and/or skincare products from the database based at least in part on the plurality of unique face and/or skin characteristics output from the first trained artificial intelligence module; input the output from the first trained artificial intelligence module and the initial set of cosmetic and/or skincare products retrieved from the database into a second trained artificial intelligence module, the second trained artificial intelligence module being trained using second historical data inputs that are associated with known product recommendations and known usage guidelines; and receive the at least one personalized recommendation as an output from the second trained artificial intelligence module.

In some aspects, the techniques described herein relate to a non-transitory computer-readable medium, wherein the trained artificial intelligence module is further trained using additional historical data inputs that are associated with known product recommendations and known usage guidelines, and wherein to generate the at least one personalized recommendation, the instructions cause the one or more processors to: query the database via the trained artificial intelligence module; and receive the at least one personalized recommendation as an output from the trained artificial intelligence module.

DETAILED DESCRIPTION

The systems and methods described herein provide an intelligent, personalized system for managing cosmetics and skincare product identification and/or usage. In particular, these systems and methods manage cosmetics and skincare product identification and/or usage based on user preferences, skin types, environment, and other relevant factors via artificial intelligence (AI) and/or machine learning (ML) processes and a comprehensive database of cosmetics products. Trained ML and AI software and hardware modules are used to generate hyper-personalized product recommendations and usage guidelines for a specific end user from a wide array of user data unique to the end user. Furthermore, these systems and methods can integrate with smart devices and smart packaging for seamless collection of the user data and for receiving user feedback used to further train the ML and AI modules. These systems and methods, in general, provide a consistent and optimal skincare and cosmetic routines for the end user that provide more effective and satisfactory outcomes when compared with traditional methods that rely on subjective user preferences and/or trial and error processes.

Figure 1:
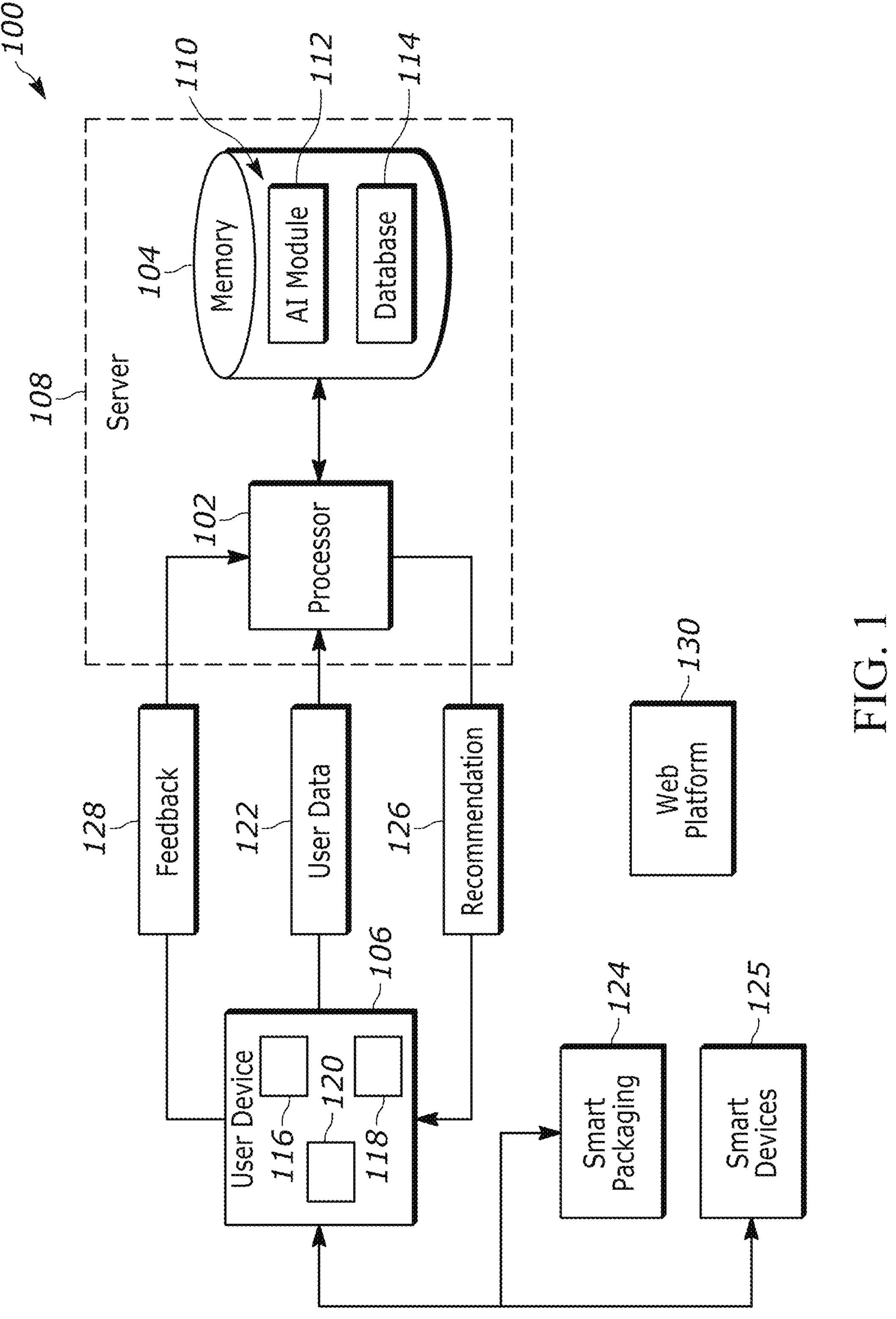
FIG. 1 illustrates a block diagram of a computing system for use in generating personalized cosmetic and/or skincare product recommendations and usage guidelines in accordance with an example aspect of the present disclosure.

With reference to FIG. 1, an example computing system 100 for generating personalized cosmetic and/or skincare product recommendations and usage guidelines is shown. The computing system 100 includes one or more processors 102, one or more memories 104, and a user device 106. The one or more processors 102 are in electrical communication with the one or more memories and the user device 106 via wired or wireless means known in the art. As shown in FIG. 1, the one or more processors 102 and the one or more memories 104 can form a server 108 that is located remote from the user device 106. In these embodiments the user device 106 can electrically communicate with the one or more processors 102 over a wide area network such as the internet. However, in other embodiments, the user device 106 can electrically communicate with the one or more processors 102 over a local area network or via a direct wired or wireless connection.

The one or more memories have stored thereon computer-executable instructions 110 that are executable by the one or more processors 102 to perform one or more of the methods described herein. At least a portion of the computer-executable instructions 110 relate to a trained artificial intelligence module 112 and a database 114 of cosmetic and/or skincare products. The database 114 can also include composition information on the cosmetic and/or skincare products, usage instructions for the cosmetic and/or skincare products, efficacy determination for the cosmetic and/or skincare products, scientific research on cosmetic and/or skincare products, rules on general understanding of dermatology and cosmetology, and any other relevant data. The database 114 can also be updated regularly to include new products and updated information.

It will be appreciated that the one or more memories 104 can be located remote from the one or more processors 102. Furthermore, in some embodiments, the trained artificial intelligence module 112 and/or the database 114 can be contained in memory devices that are remote from the one or more processors 102. In these embodiments, the one or more processors can access the trained artificial intelligence module 112 and/or the database 114 using a network or similar remote transmission system known in the art.

The trained artificial intelligence module 112 can comprise a set of interconnected nodes, layers, trained parameter values (e.g., multiplicative weights, additive bias, etc.), etc. The trained parameters are set via backpropagation techniques in a training process that uses historical data inputs that are associated with known face and/or skin characteristics. Various architectures for the trained artificial intelligence module 112 are possible, including, but not limited to, convolutional neural network (CNN) architectures, transformer architectures, recurrent/recursive neural network (RNN) architectures, sorting/clustering architectures, etc. The trained parameter values of the trained artificial intelligence module 112 are set via the iterative training process in ways that identify or recognize patterns and trends in the historical data inputs. In some embodiments, some or all of the data in the database 114 can form a portion of the historical data inputs. For example, the scientific research on cosmetic and/or skincare products, rules on general understanding of dermatology and cosmetology, and the composition information on the cosmetic and/or skincare products can be used when training the trained artificial intelligence module 112.

In some embodiments, the historical data inputs can include known face and/or skin characteristics taken from a diversity of demographic backgrounds including a plurality of ethnicities, age groups, skin types, etc. Furthermore, the historical data inputs can be taken from statistically significant cross-section of the population to ensure diverse representation in the data and to provide for diverse recommendations in the output of the trained artificial intelligence module 112. In some embodiments, bias detection algorithms configured as part of a bias detection module may be employed to identify and mitigate potential biases in data interpretation during the training process for the trained artificial intelligence module 112. The bias detection algorithms can adjust (dynamically or otherwise) the weighting and other factors of the parameter values of the trained artificial intelligence module 112 to correct for detected bias patterns and enhance fairness and accuracy of the product recommendations across varying demographics. It should also be appreciated that the bias detection algorithms and the bias detection module may be utilized to correct biases in the user data that is input to the trained artificial intelligence module 112 and the product recommendation outputs of the trained artificial intelligence module 112 as described herein. In this way, the computing system 100 can be configured to correct for possible biases even after the training of the trained artificial intelligence module 112.

The user device 106 includes a processor 116, a memory 118, and a display 120. The processor 116 is configured to execute machine readable instruction stored in the memory 118 to assist in performing at least some of the methods described herein. The user device 106 can include a personal computer, smart phone, tablet, etc. The machine readable instructions stored in the memory 118 can include a mobile application and/or a web browser for interfacing with a web application that connects with the one or more processors 102.

In general, the processor 116 is configured to compile and send user data 122 to the one or more processors 102. For example, the user data 122 can be received by a data collection module of the one or more processors 102. The user data 122 is indicative of at least a plurality of unique face and/or skin characteristics associated with an individual user. These characteristics can include skin types, texture, or tone (normal, dry, oily, sensitive, mixed, smoothness, elasticity, evenness of tone, dry patches, oily zones, etc.); face surface features (acne scars, surgical scars, freckles, pimples, fine lines, wrinkles pore size and visibility, sun damage from sunspots or texture changes, etc.); facial contour details; hair details (color, straight type, wavey type, curly type, eyebrow shape, eyebrow thickness, etc.); eye details (color, dark circles, eye bags, crow's feet, etc.); lip details (chapping, dryness, shape, fullness, etc.); skin issues (e.g., acne such as blackheads, whiteheads, cystic acne; rosacea; eczema; hyperpigmentation, melasma, etc.); etc. The user data can also be indicative of other details such as a location of the individual user; environmental factors (effects of pollution, UV exposure, humidity levels, seasonal changes such as winter dryness and summer oiliness, etc.); product interactions (allergic reactions, irritations from certain ingredients; effectiveness of different product types such as serums, creams, or gels, etc.); and/or lifestyle factors (diet and nutrition impact, sleep patterns, stress levels, etc.). The user device 106 and/or the one or more processors 102 can compile the user data 122 from text, image, video, etc. inputs received thereby from the individual user as described in more detail below. Furthermore, the user device 106 can interface with smart packaging 124 and other smart devices 125 (e.g., sleep trackers, fitness monitors, smart mirrors, smart bathroom scales, environmental sensors, etc.) to compile at least a portion of the user data 122. The portions of the user data 122 received from the mart packaging 124 and other smart devices 125 can include data from fitness trackers about physical activity, information from smart mirrors regarding daily skin condition changes, insights from environmental sensors about air quality and UV index, etc.

In some embodiments, the user data 122 includes one or more of data indicative of current face and/or skin characteristics of the individual user, face and/or skin preferences of the individual user received as user input on the user device 106, a location of the individual user (e.g., a current location, a home location, etc.), known allergies of the user, demographic data for the user (e.g., age, gender, ethnicity, etc.), environmental data such as the weather and pollution levels, currently used cosmetic and/or skincare products, and usage trends for the currently used cosmetic and/or skincare products. The user data 122 can also include one or more of data indicative of dietary impact (effects of specific foods such as dairy, sugar, and/or fats on skin health, vitamin deficiencies, etc.); hormonal changes (puberty, menstrual cycle phases, pregnancy, menopause, etc.); medical conditions (diabetes related skin issues, thyroid related skin changes, autoimmune conditions affecting skin such as lupus or psoriasis); aging signs (loss of skin elasticity, sagging skin, age spots, etc.); behavioral factors (smoking effects on skin, alcohol consumption impacts, skincare routine adherence, etc.); cosmetic preferences (preferred product types such as organic, cruelty-free, or hypoallergenic, preferred brands or ingredients, makeup styles and preferences, etc.); environmental allergens (pollen, dust, animal dander, etc.); and/or lifestyle patterns (physical activity levels and their impact on skin, exposure to air conditioning or heating, etc.).

The data indicative of the usage trends for the currently used cosmetic and/or skincare products of the individual user can include data received from the smart packaging 124. In particular, the smart packaging 124 can be packaging for the currently used cosmetic and/or skincare products of the individual user and the data received from smart packaging 124 can include monitored use of the currently used cosmetic and/or skincare products over time, an expiration date of the currently used cosmetic and/or skincare products, and/or a storage condition of the currently used cosmetic and/or skincare products. Furthermore, in some embodiments, the data indicative of the individual user's current face and/or skin characteristics can include one or multiple images of the individual user's face and/or skin. In these embodiments, the historical data inputs include one or more images of skin and faces having the known face and/or skin characteristics.

Figure 9:
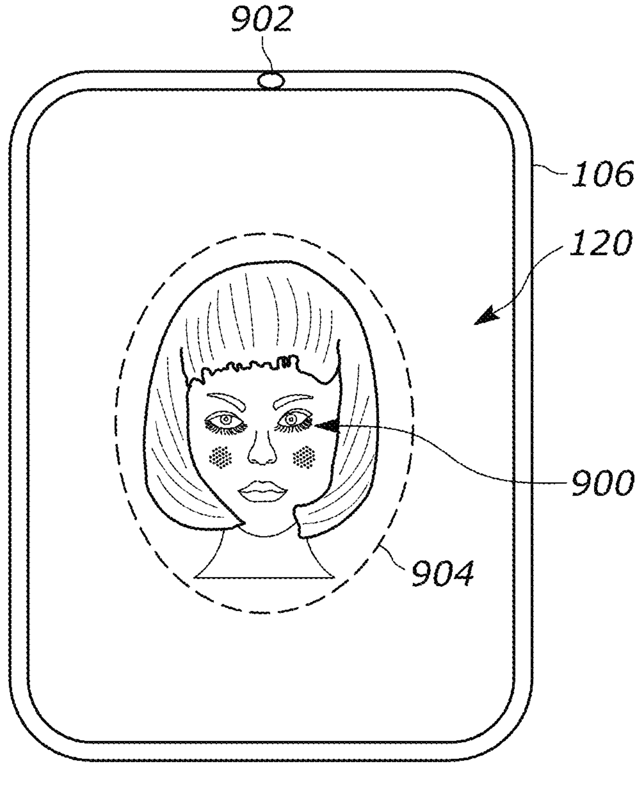
FIGS. 9-11 illustrate example user interface screens for a user device of the computing system of FIG. 1.
Figure 10:
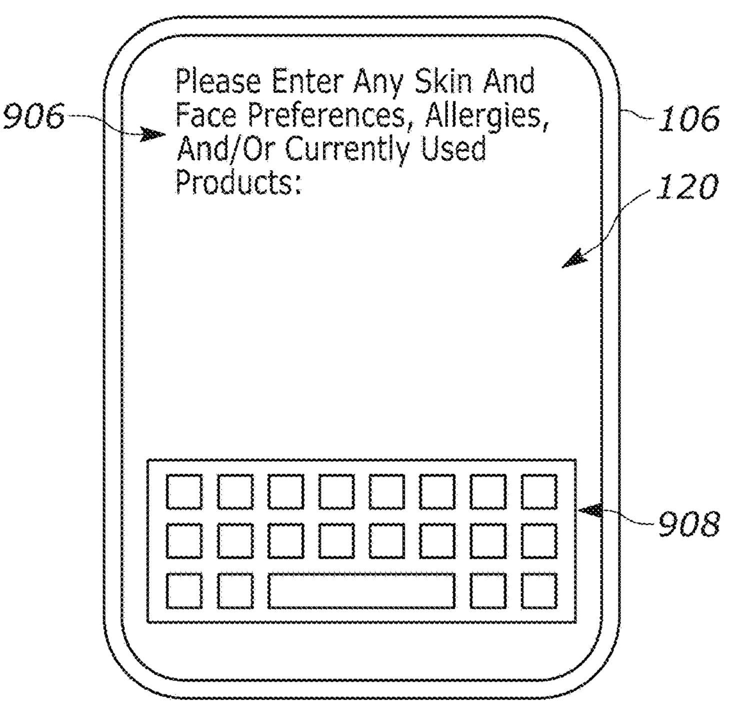

FIGS. 9 and 10 show example user interfaces for the display 120 used for gathering the user data 122 via the user device 106. First, FIG. 9 shows a user interface screen for capturing image data of the user's face 900 using a camera 902 of the user device 106. In some embodiments, the user's face 900 can be moved to fall within a bounding region 904 and the camera 902 can capture image data inside the bounding region 904. The captured image data can then be exported to the one or more processors 102 along with the rest of the user data and processed through the trained artificial intelligence module 112 where face and/or skin characteristics are extracted as described herein. In particular, the trained artificial intelligence module 112 can output or otherwise recognize objective and consistent data for the user's face and or skin (e.g., objective data identifying the skin types, face surface features, facial contour details, hair color, eye color, etc. described herein).

Second, FIG. 10 shows a user interface screen on the display 120 of the user device 106 for gathering text based components of the user data 122 such as the user's skin and face preferences, allergies, and currently used face and/or skin care products. The user interface screen includes a prompt 906 soliciting the text component of the user data 122 and an input interface 908 (e.g., an on screen keyboard, voice to text system, etc.) for entering the text component of the user data 122 on the user device 106. Once entered, the text component of the user data 122 can be transmitted to the one or more processors 102 along with the rest of the user data 122 and processed through the trained artificial intelligence module 112 as described herein. In particular, the trained artificial intelligence module 112 can convert the text data into digital token representations that are then embedded as vector representations for use as inputs to the trained artificial intelligence module 112. During the processing of the user data 122 by the trained artificial intelligence module 112, the text components can be grouped with the face and/or skin characteristics that are extracted from the user provided image data to provide a normalized and consistent data set representative of all of the user's subjective preferences and extracted face and/or skin characteristics.

With reference again to FIG. 1, he one or more processors 102 are configured to receive the user data 122 from the user device 106 and use the user data 122 along with the trained artificial intelligence module 112 and the cosmetic and/or skincare product information in the database 114 to generate at least one personalized recommendation 126 for transmitting to the user device 106 in a notification that is presented on the display 120. Together the one or more processors 102, the trained artificial intelligence module 112, and the database 114 can comprise a Hyper-Personalization Module that outputs the at least one personalized recommendation 126. The at least one personalized recommendation 126 includes a listing of one or more of the cosmetic and/or skincare products contained in the database 114 that are appropriate for the unique characteristics of the user (e.g., the product is appropriate for the user's location, addresses a face or skin issue identified from images of the user, conforms to the preferences input by the user, etc.). Such products can include moisturizers, sunscreens, cleansers, serums, acne treatments, anti-ageing treatments, etc. For example, acne cleansers, treatment gels, and/or moisturizers may be recommended where the unique characteristics of the user indicate the presence of acne or that the user's skin is prone to developing acne. Furthermore, where the unique characteristics of the user indicate dry skin is a concern, the at least one personalized recommendation 126 can include cleanser, serum, and moisturizer recommendations. In some cases, the specific cleanser, serum, and moisturizer can be selected based on the skin type (e.g., sensitive skin, oily skin, aging skin, etc.). Where the unique characteristics of the user include special location or environmental factors, the at least one personalized recommendation 126 can include sunscreen and lightweight moisturizers for sunny/humid climates; hydrating cleansers and intensive moisturizers for cold/dry climates; and/or cleansers and antioxidant serums for polluted areas.

Figure 11:
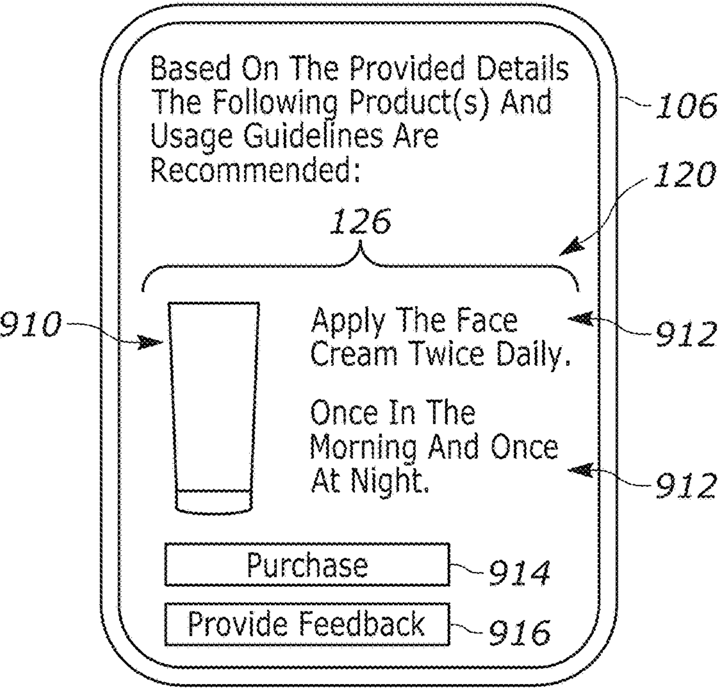

The recommendation 126 also includes associated usage guidelines for each listed product (e.g., a specific plan for when and how to use the cosmetic and/or skincare product contained in the at least one personalized recommendation 126 such as the order of product application, frequency of application, and quantity of product for each application). As shown in FIG. 11, the recommendation 126 can be presented on the display 120 of the user device 106 and can include an image 910 of the one or more recommended products alongside text 912 documenting the usage guidelines. The display 120 can also show an interface button 914 enabling purchase of the recommended product.

Furthermore, display 120 can also show an interface button for initiating feedback 128 on the at least one personalized recommendation 126. The feedback 128 is provided by the user device 106 to the one or more processors 102. The feedback 128 can then be used by the one or more processors 102 to update and refine the trained artificial intelligence module 112 as described in more detail herein. In some embodiments, the bias detection algorithms and the bias detection module described herein may be employed to identify patterns indicating potential bias in product recommendations as indicated by the feedback 128. In these embodiments, the updates and refinements to the trained artificial intelligence module 112 can specifically be configured to correct for the identified bias patterns.

The at least one personalized recommendation 126 is a customized output based on the processing of the user data 122. For example, the at least one personalized recommendation 126 can account for each of the current face and/or skin characteristics of the individual user, the face and/or skin preferences of the individual user received as user input on the user device 106, the location of the individual user (e.g., a current location, a home location, etc.), the known allergies of the user, the demographic data for the user (e.g., age, gender, ethnicity, etc.), the environmental data such as the weather and pollution levels, the currently used cosmetic and/or skincare products, and the usage trends for the currently used cosmetic and/or skincare products. For example, the at least one personalized recommendation 126 can recommend products that include ultra violet light protection when the user is located in hot or normally sunny locations. For users where their current face and/or skin characteristics, as identified from images or other inputs, include pimples or similar facial blemishes, the at least one personalized recommendation 126 can recommend products that treat the pimples and similar facial blemishes along with usage guidelines for such treatment.

In some embodiments, the at least one personalized recommendation 126 can be updated or replaced by a new recommendation when at least some portion of the user data 122 changes. For example, a change in the user's location or the general environmental conditions relating to the user can produce an updated or new personalized recommendation by reprocessing the updated user data with the computing system 100 in any of the manners described herein. Similarly, in some embodiments, the at least one personalized recommendation 126 can include a set of multiple products that are recommended for use at different times based on predicable changes to the user's environment. For example, these predicable changes can include seasonally adjusted product recommendations that account for seasonal changes in weather and environmental factors (e.g., recommend different products for use in the winter and summer months).

Furthermore, in some embodiments, the user data can be provided to the one or more processors 102 on a real time basis (e.g., a live video feed, continuous environmental data, etc.) such that the at least one personalized recommendation 126 is dynamically updated.

In some embodiments, the one or more processors 102 can host and/or connect to another server that hosts a web platform 130. The web platform 130 can be accessed by the user device 106 via a web browser, application specific software, etc. In some embodiments, the web platform 130 can store the at least one personalized recommendation 126, copies of the user data 122, and other data on the individual user in a secure private database. For example, the at least one personalized recommendation 126, copies of the user data 122, and other data on the individual user can be stored in the secure private database in encrypted formats and in accordance with data protection regulations. The web platform 130 includes at least a profile creation section, a product selection section, a product details section, and a feedback section. The profile creation section is where the user device 106 can upload the user data 122 and other relevant information. For example, a user can customize their preferences and priorities for skincare and cosmetic products to focus on anti-aging, hydration, acne treatment, etc. The product selection section can be where the user, via the user device 106, views the recommended product. The product details section is where the use can view detailed information about the recommended product, including composition, usage instructions, and other relevant data such as comparison with additional products to see how each product aligns with the recommended product. In some embodiments, the other relevant data can include an assessment of the environmental impact of the recommended products and suggestions of eco-friendly alternatives if available. The feedback section is where the user device 106 can upload the feedback 128.

The web platform 130 can additionally provide a forum or social space where the user can share experiences and feedback on products including the feedback 128 on products recommended in the at least one personalized recommendation 126, which create a community for exchange of information and mutual learning including suggestions on products and usage from other users. The web platform 130 can also integrate or interface with eCommerce platforms to allow the user to conveniently purchase the recommended product and/or automatically reorder favorite products based on need, usage patterns, stock levels etc., Similarly, the web platform 130 can also integrate or interface with an inventory management system that tracks the availability of recommended products in real-time and suggests alternative products if the recommended ones are out of stock. In some embodiments, the web platform 130 can store a set goals for the user that are related to their skincare and cosmetics routines and enable the user to track progress towards the set of goals. The web platform 130 can include a troubleshooting feature that can identify potential causes of skin issues based on the user data 122, and provide solutions to the skin issues. A virtual try-on feature within the web platform 130 can allow the user of the user device 106 to visualize how products like the recommended product may look on the user's skin before purchase.

The web platform 130 and/or the one or more processors 102 can additionally be configured to provide to the user device 106 ongoing updates to the at least one personalized recommendation 126 that occur based on changes to the user data 122 and additional notifications, alerts, reminders, etc. relating to the user data 122. These additional alerts can include alerts and reminders to the user device 106 that: 1) remind the user to maintain the recommended product usage guidelines; 2) indicate expiration of products; 3) document potential allergens or harmful ingredients in the products used by the user; 4) detail a change in skincare or cosmetics routine resulting from a change in environmental conditions; 5) document potential future skin issues and preventative measures based on analysis of the user data 122; 6) present adjusted product recommendations and usage guidelines to account for the potential future skin issues; and 7) present new products on the market that match the preferences in the user data 122. The web platform 130 and/or the one or more processors 102 can also provide educational content relating to the user data 122 such as information about skin type, environmental factors, and product ingredients that enhance the user's understanding and decision-making regarding skincare and cosmetics routines, For example, the educational content can include guidance on best practices for skincare and cosmetics application techniques.

Figure 2:
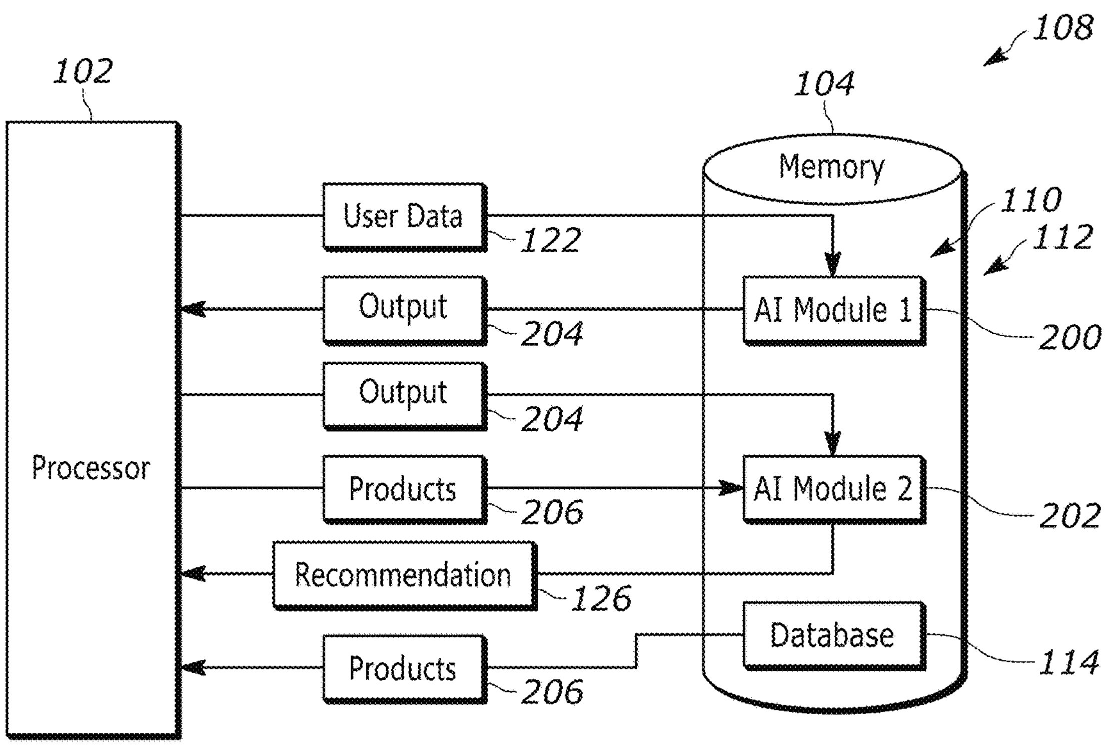
FIG. 2 illustrates a block diagram of an example server portion of the computing system of FIG. 1.
Figure 3:
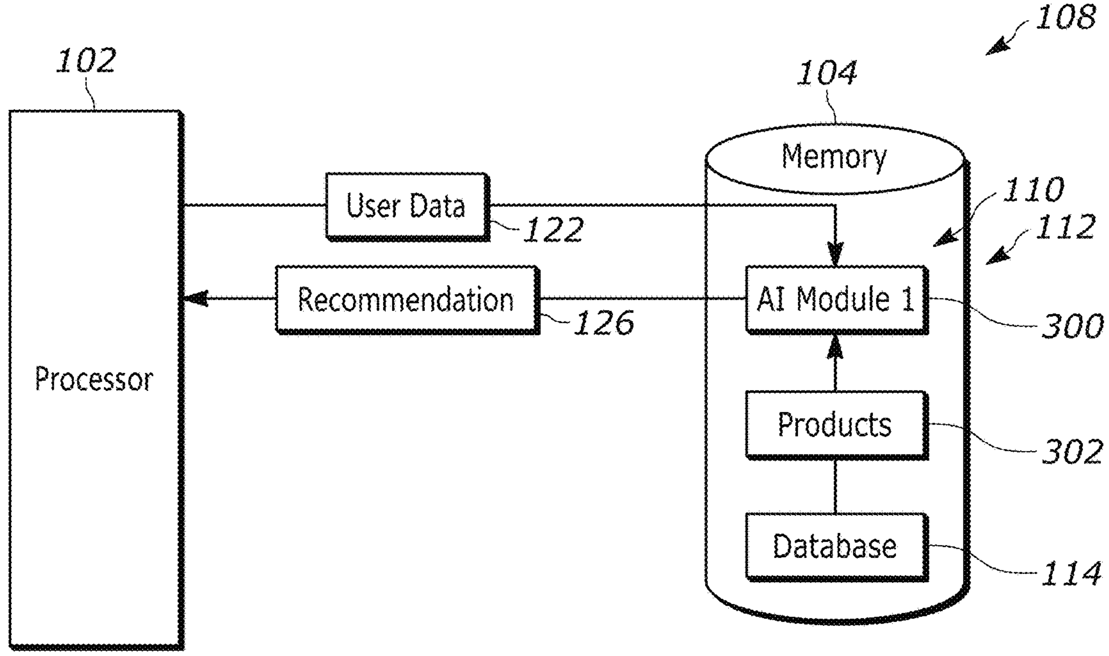
FIG. 3 illustrates a block diagram of an example server portion of the computing system of FIG. 1.

With reference now to FIG. 2, one embodiment of the server 108 is shown. In this embodiment, the trained artificial intelligence module 112 is a first trained artificial intelligence module 200 and the memory 104 includes a second trained artificial intelligence module 202. The historical data inputs used to train the first trained artificial intelligence module 200 are first historical data inputs and the second trained artificial intelligence module 202 is trained using second historical data inputs that are associated with known product recommendations and known usage guidelines. FIG. 3 shows an alternate embodiment of the server 108 where the first trained artificial intelligence module 200 and the second trained artificial intelligence module 202 are replaced by a single trained artificial intelligence module 300 that encompasses the trained artificial intelligence module 112 as further trained using additional historical data inputs that are associated with known product recommendations and known usage guidelines.

Figure 4:
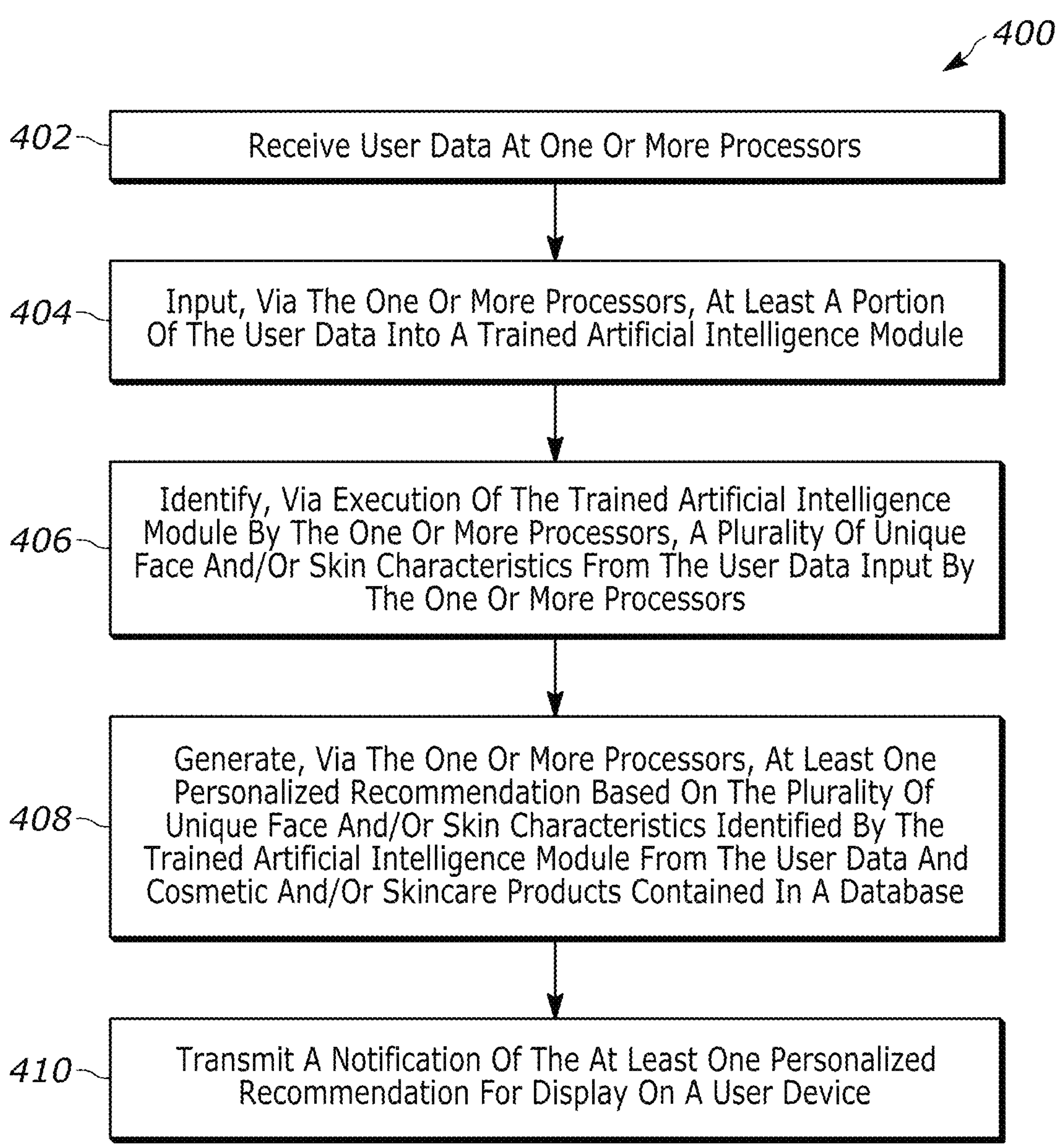
FIG. 4 illustrates a flow diagram of an example method for generating personalized cosmetic and/or skincare product recommendations and usage guidelines.

With reference now to FIG. 4, a flow chart for a computer implemented method 400 for generating the personalized recommendation 126 using the computing system 100 is shown. The method 400 includes receiving the user data 122 at the one or more processors 102, as in 401. Then, the method 400 includes inputting, via the one or more processors 102, at least a portion of the user data 122 into the trained artificial intelligence module 112, as in 406. For example, in embodiments where the data indicative of the individual user's current face and/or skin characteristics includes the one or multiple images of the individual user's face and/or skin (see e.g., FIG. 9), the portion of the user data 122 input into the trained artificial intelligence module 112 includes the one or multiple images.

After inputting the user data 122, the method 400 includes identifying, via execution of the trained artificial intelligence module 112 by the one or more processors 102, the plurality of unique face and/or skin characteristics associated with an individual user from the user data 122 input by the one or more processors 102. For example, the trained artificial intelligence module 112 can receive the one or multiple images as an input and extract therefrom the skin types, face surface features, facial contour details, hair color, eye color, etc., Execution of the trained artificial intelligence module 112 can include transforming the input user data 122 into embedded tokens, data values, etc. to which various modification functions and the trained parameter values are applied to generate an output of the trained artificial intelligence module 112.

Furthermore, the method 400 can include generating, via the one or more processors 102, the at least one personalized recommendation 126 based on the plurality of unique face and/or skin characteristics identified by the trained artificial intelligence module 112 from the user data 122 and the cosmetic and/or skincare products contained in the database 114, as in 408. Then, the method 400 can include transmitting a notification of the at least one personalized recommendation 126 for display on the user device 106, as in 410 (see e.g., FIG. 11).

Figure 5:
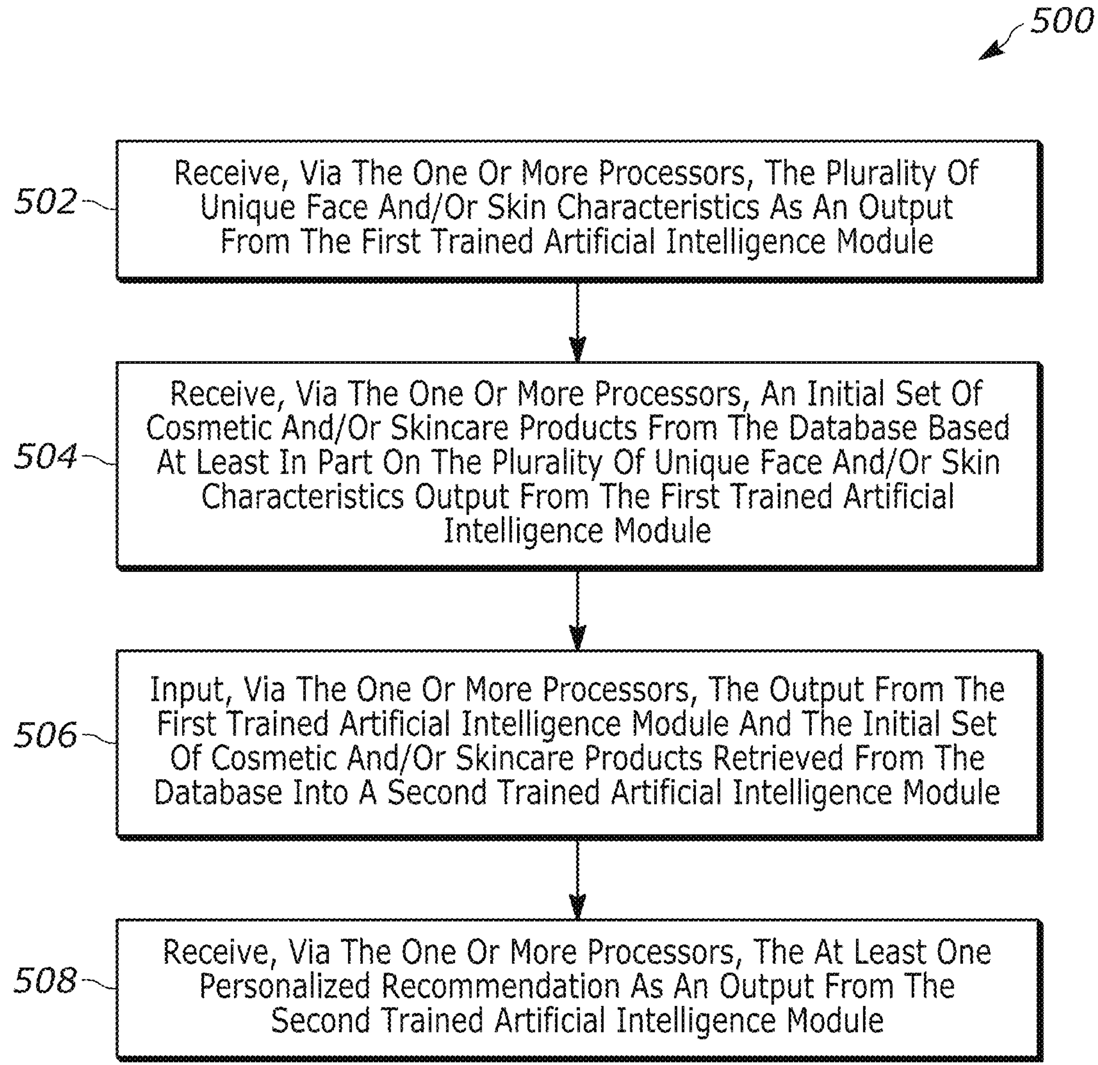
FIG. 5 illustrates a flow diagram of an example method for performing one of the steps of the method of FIG. 4.

With reference now to FIG. 5, a method 500 is shown. The method 500 is for performance of the generating step 408 of the method 400 using the variant of the server 108 that employs the first trained artificial intelligence module 200 and the second trained artificial intelligence module 202 as shown in FIG. 2. The method 500 can include receiving via the one or more processors 102, the plurality of unique face and/or skin characteristics as an output 204 from the first trained artificial intelligence module 200, as in 502. For example, the output 204 can include a list of the skin types, face surface features, facial contour details, hair color, eye color, etc. extracted from the images of the user. Then, the method 500 can include, retrieving, via the one or more processors 102, an initial set of cosmetic and/or skincare products 206 from the database 114 based at least in part on the plurality of unique face and/or skin characteristics output from the first trained artificial intelligence module 200 (e.g., output 204 in FIG. 2), as in 504. Next, the method 500 can include inputting, via the one or more processors 102, the output 204 from the first trained artificial intelligence module 200 and the initial set of cosmetic and/or skincare products 206 retrieved from the database 114 into the second trained artificial intelligence module 202, as in 506. Next, the method 500 can include receiving, via the one or more processors 102, the at least one personalized recommendation 126 as an output from the second trained artificial intelligence module 202, as in 508.

In some embodiments, the method 500 can also include receiving, at the one or more processors 102, the user feedback 128 regarding the at least one personalized recommendation 126 from the user device 106 and updating the second trained artificial intelligence module 202 based on the feedback 128. The feedback 128 can include a binary or scaled rating of the product identified in the at least one personalized recommendation 126 and/or detailed comments about how the recommended product performed (e.g., a log skin reactions or changes that result from use of the recommended product). The feedback 128 can also be incorporated into a rating system for products in the database 114 that is additionally based on scientific evidence.

Figure 6:
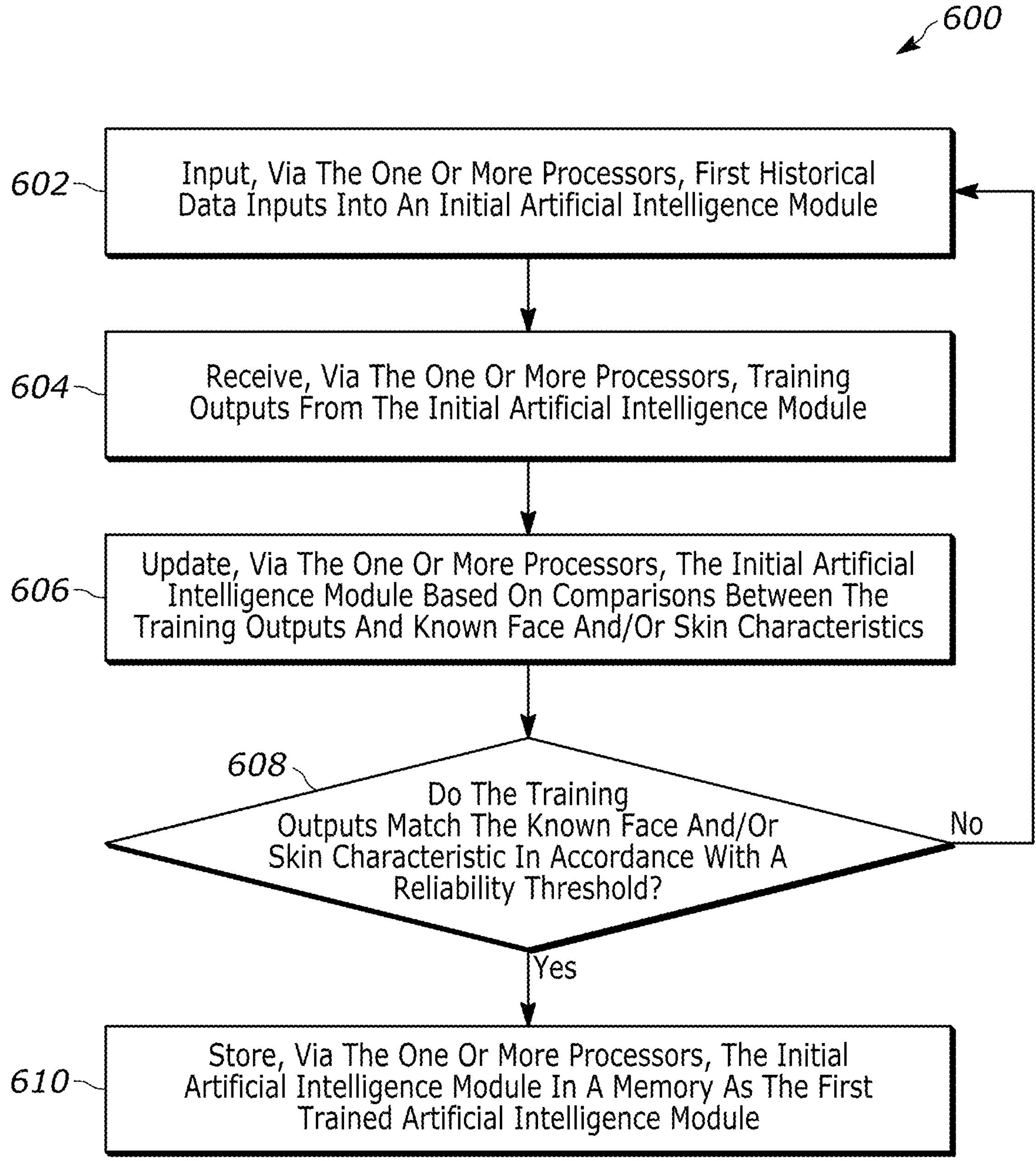
FIG. 6 illustrates a flow diagram of an example method for training an artificial intelligence module in accordance with an example aspect of the present disclosure.

FIG. 6 shows a method 600 for training the first trained artificial intelligence module 200. The method 600 can include inputting, via the one or more processors 102, the first historical data inputs into an initial artificial intelligence module, the first historical data inputs including one or more images of skin and faces having the known face and/or skin characteristics, as in 602. Then, the method 600 can include receiving, via the one or more processors 102, training outputs from the initial artificial intelligence module, as in 604. The training outputs include face and/or skin characteristics (e.g., skin types, face surface features, facial contour details, hair color, eye color, etc.) extracted by the initial artificial intelligence module from the first historical data inputs by applying an initialized set of weights, bias, etc, to embed versions of the first historical data inputs. Then, the method 600 can include updating, via the one or more processors 102, the initial artificial intelligence module based on comparisons between the training outputs and the known face and/or skin characteristics, as in 606. The updating process can include modifying the initialized set of weights, bias, etc, via backpropagation.

The method 600 also includes determining whether the training outputs match the known face and/or skin characteristic in accordance with a reliability threshold, as in 608. This step can be performed after or before the initial artificial intelligence module is updated. If performed after, as shown in FIG. 6, the method 600 can include iteratively returning to perform steps 602, 604, and 606 until the training outputs match the known face and/or skin characteristic in accordance with the reliability threshold. When step 608 is performed before the updating step 606, the updating step 606 can be performed when the training outputs do not match the known face and/or skin characteristic in accordance with the reliability threshold and before iteratively repeating steps 602 and 604.

In either case, once the reliability threshold is met (e.g., the training outputs do match the known face and/or skin characteristic in accordance with the reliability threshold), the method 600 can include storing, via the one or more processors 102, the initial artificial intelligence module, including all the iterated updates in the memory 104 as the first trained artificial intelligence module 200, as in 610. The reliability threshold can include a threshold percentage number of the training outputs that match the known face and/or skin characteristics, a set number of iterations through steps 602, 604, and 606, and/or a threshold percentage change in the weights, bias, etc. (e.g., the iterative training can stop when an amount of change to the weights, bias, etc. falls below the threshold percentage).

Figure 7:
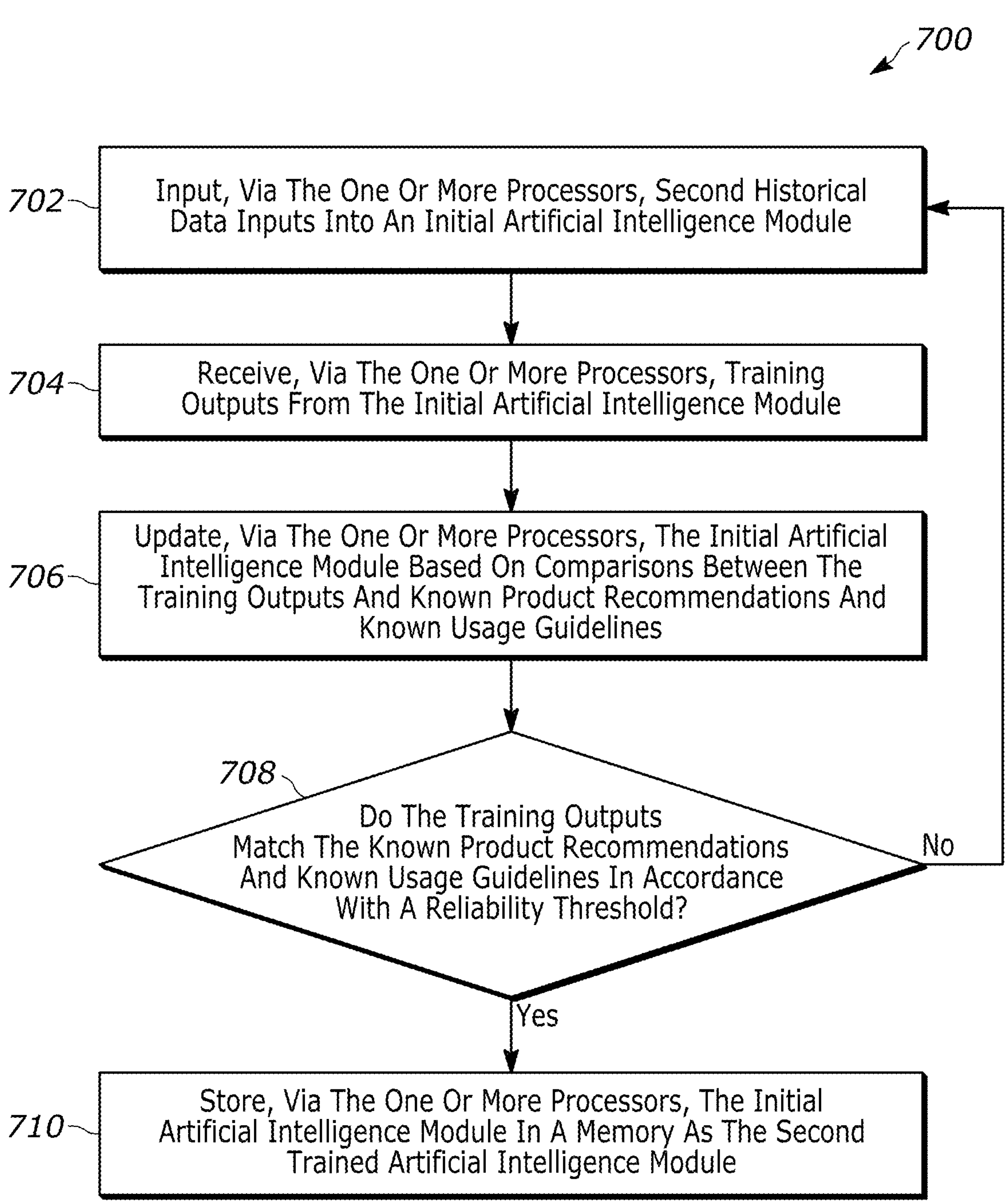
FIG. 7 illustrates a flow diagram of an example method for training an artificial intelligence module in accordance with an example aspect of the present disclosure.

FIG. 7 shows a method 700 for training the second trained artificial intelligence module 202. The method 700 is similar to the method 600 and can include inputting via the one or more processors 102, second historical data inputs into an initial artificial intelligence module, as in 702. The second historical data inputs can include pluralities of historical face and/or skin characteristics, historical sets of cosmetic and/or skincare products, and the known product recommendations and known usage guidelines. Then, the method 700 can include receiving, via the one or more processors 102, training outputs from the initial artificial intelligence module, as in 704. The training outputs can include product recommendations and associated usage guidelines identified by the initial artificial intelligence module from the second historical data inputs by applying an initialized set of weights, bias, etc, to embed versions of the second historical data inputs. Then, the method 700 can include updating, via the one or more processors 102, the initial artificial intelligence module based on comparisons between the training outputs and the known product recommendations and known usage guidelines, as in 706. Like the updating step 606 of the method 600, the updating process for the method 700 can include modifying the initialized set of weights, bias, etc, via backpropagation.

The method 700 also includes determining whether the training outputs match the known product recommendations and known usage guidelines in accordance with a reliability threshold, as in 708. This step can be performed after or before the initial artificial intelligence module is updated. If performed after, as shown in FIG. 7, the method 700 can include iteratively returning to perform steps 702, 704, and 706 until the training outputs match the known product recommendations and known usage guidelines in accordance with the reliability threshold. When step 708 is performed before the updating step 706, the updating step

706 can be performed when the training outputs do not match the known product recommendations and known usage guidelines in accordance with the reliability threshold and before iteratively repeating steps 702 and 704.

In either case, once the reliability threshold is met (e.g., the training outputs do match the known product recommendations and known usage guidelines in accordance with the reliability threshold), the method 700 can include storing, via the one or more processors 102, the initial artificial intelligence module, including all the iterated updates, in the memory 104 as the second trained artificial intelligence module 202, as in 710. The reliability threshold can include a threshold percentage number of the training outputs that match the known product recommendations and known usage guidelines, a set number of iterations through steps 702, 704, and 706, and/or a threshold percentage change in the weights, bias, etc. (e.g., the iterative training can stop when an amount of change to the weights, bias, etc. falls below the threshold percentage).

Figure 8:
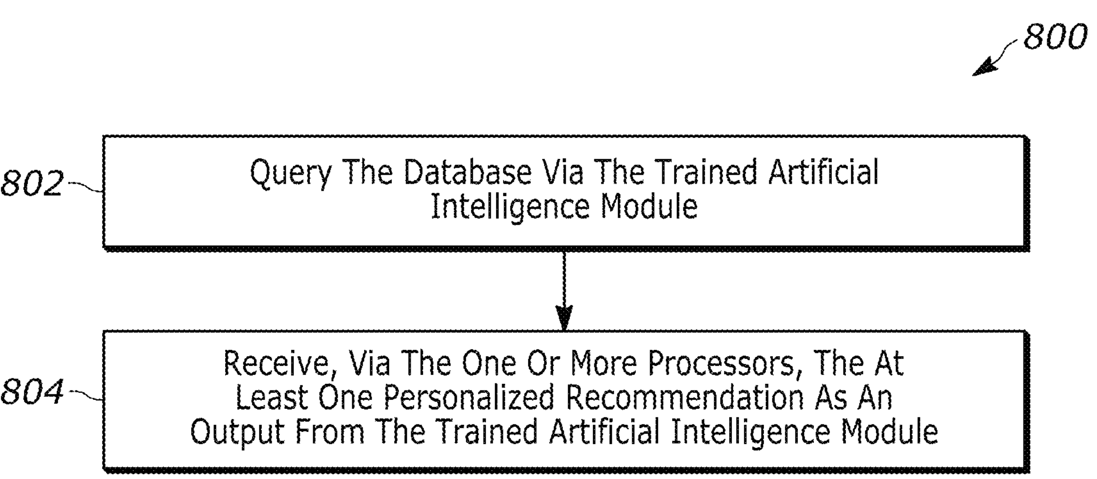
FIG. 8 illustrates a flow diagram of an example method for performing one of the steps of the method of FIG. 4.

With reference now to FIG. 8, a method 800 is shown. The method 800 is for performance of the generating step 408 of the method 400 using the variant of the server 108 that employs the single trained artificial intelligence module 300 as shown in FIG. 3. The method 800 includes querying the database 114 via the single trained artificial intelligence module 300 to receive a set of relevant cosmetic and/or skincare products 302 and receiving, via the one or more processors 102, the at least one personalized recommendation 126 as an output from the single trained artificial intelligence module 300, as in 802 and 804. The set of relevant cosmetic and/or skincare products 302 can be the same or different from the initial set of cosmetic and/or skincare products 206 shown in FIG. 2 and used conjunction with the method 500 shown in FIG. 5. It will also be appreciated that in some embodiments, the querying step 802 can be done by the one or more processors 102 and the set of relevant cosmetic and/or skincare products 302 can be can be input into the single trained artificial intelligence module 300 by the one or more processors 102. In other embodiments, the data on the cosmetic and/or skincare products stored in the database 114 can be trained into the parameter values of the single trained artificial intelligence module 300 itself such that the database 114 can be omitted from the computing system 100.

In some embodiments and similar to the method 500, the method 800 can include receiving, at the one or more processors 102, the user feedback 128 regarding the at least one personalized recommendation 126 from the user device 106 and updating the single trained artificial intelligence module 300 based on the feedback 128.

In some embodiments, the computing system 100 can be used to evaluate the expected results of using the cosmetic and/or skincare product included in the at least one personalized recommendation 126. The expected results can include specific marketed claims about a products' effects. Furthermore, this evaluation can identify both overly optimistic and pessimistic marketing claims to enable additional testing of the cosmetic and/or skincare product in relation to future adjustment of the marketed claims.

Evaluation of the expected results can include the one or more processors 102 receiving a plurality of images of the user's face and/or skin during a time period when the recommended cosmetic and/or skincare product was being used. Changes in the images over time can be used to track progress and provide a visual representation of improvements in skin condition from use of the recommended product.

Furthermore, the plurality of images can be input by the one or more processors 102 into the trained artificial intelligence module 112. The one or more processors 102 can then receive a plurality of additional face and/or skin characteristics extracted from the plurality of images as an output from the trained artificial intelligence module 112 (e.g., skin types, face surface features, facial contour details, hair colors, eye colors, etc.). Changes between the plurality of additional face and/or skin characteristics output from the trained artificial intelligence module 112 over time can be compared to expected changes over time from use of the recommended cosmetic and/or skincare product (e.g., the expected results, marketing claims, etc.) to identify deviations from the expected changes. In some embodiments, the changes over time identified from the outputs of the trained artificial intelligence module 112 can also be compared against scientific studies of the cosmetic and/or skincare product to further evaluate the product's efficacy. A second notification documenting the deviations from the expected changes over time can be sent for display on a second user device different from the first user device 106. It will be appreciated that a similar process can be used to evaluate the expected results for other products that are currently used by the user even if not included in the at least one personalized recommendation 126.

This detailed description is to be construed as exemplary only and does not describe every possible embodiment, as describing every possible embodiment would be impractical, if not impossible. One may implement numerous alternate embodiments, using either current technology or technology developed after the filing date of this application.

Although the present disclosure sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including applications, instructions, etc., These may constitute either software (e.g., code embodied on a machine-readable medium or in a transmission signal) or hardware. In hardware, the instructions, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a module described herein can comprise a hardware module that may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a business or home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, non-transitory computer readable medium, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the “a” or “an” are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112 (f) unless traditional means-plus-function language is expressly recited, such as “means for” or “step for” language being explicitly recited in the claim(s).

What is claimed is:

1. A computer implemented method for generating personalized cosmetic and/or skincare product recommendations and usage guidelines, the method comprising:

receiving user data at one or more processors, the user data being indicative of at least a plurality of unique face and/or skin characteristics associated with an individual user;

inputting, via the one or more processors, at least a portion of the user data into a first trained artificial intelligence module, the first trained artificial intelligence module being trained using first historical data inputs that are associated with known face and/or skin characteristics;

identifying, via execution of the first trained artificial intelligence module by the one or more processors, the plurality of unique face and/or skin characteristics from the user data input by the one or more processors;

retrieving, via the one or more processors, an initial set of cosmetic and/or skincare products from a database based at least in part on the plurality of unique face and/or skin characteristics;

inputting, via the one or more processors, the output from the first trained artificial intelligence module and the initial set of cosmetic and/or skincare products retrieved from the database into a second trained artificial intelligence module;

generating, via execution of the second trained artificial intelligence module by the one or more processors, at least one personalized recommendation by processing the plurality of unique face and/or skin characteristics and the cosmetic and/or skincare products retrieved from the database, wherein:

the second trained artificial intelligence module is trained using second historical data inputs that are associated with known product recommendations and known usage guidelines, and the at least one personalized recommendation is for one of the cosmetic and/or skincare products retrieved from the database and includes associated usage guidelines; and transmitting a notification of the at least one personalized recommendation for display on a user device.

2. The computer implemented method of claim 1, wherein training the first trained artificial intelligence module comprises:

iteratively inputting, via the one or more processors, the first historical data inputs into an initial artificial intelligence module, the first historical data inputs including one or more images of skin and faces having the known face and/or skin characteristics;

iteratively receiving, via the one or more processors, training outputs from the initial artificial intelligence module, the training outputs including face and/or skin characteristics extracted by the initial artificial intelligence module from the first historical data inputs;

iteratively updating, via the one or more processors, the initial artificial intelligence module based on comparisons between the training outputs and the known face and/or skin characteristics through multiple iterations; and storing, via the one or more processors, the initial artificial intelligence module in a memory as the first trained artificial intelligence module when the training outputs match the known face and/or skin characteristic in accordance with a reliability threshold, the reliability threshold being a threshold percentage number of the training outputs that match the known face and/or skin characteristics.

3. The computer implemented method of claim 1, wherein training the second trained artificial intelligence module comprises:

iteratively inputting, via the one or more processors, the second historical data inputs into an initial artificial intelligence module, the second historical data inputs including pluralities of historical face and/or skin characteristics, historical sets of cosmetic and/or skincare products, and the known product recommendations and known usage guidelines;

iteratively receiving, via the one or more processors, training outputs from the initial artificial intelligence module, the training outputs including product recommendations and associated usage guidelines identified by the initial artificial intelligence module from the second historical data inputs;

iteratively updating, via the one or more processors, the initial artificial intelligence module based on comparisons between the training outputs and the known product recommendations and known usage guidelines; and storing, via the one or more processors, the initial artificial intelligence module in a memory as the second trained artificial intelligence module when the training outputs match the known product recommendations and known usage guidelines in accordance with a reliability threshold, the reliability threshold being a threshold percentage number of the training outputs that match the known product recommendations and known usage guidelines.

4. The computer implemented method of claim 1, further comprising:

receiving, at the one or more processors, user feedback regarding the at least one personalized recommendation; and updating the second trained artificial intelligence module based on the feedback.

5. The computer implemented method of claim 1, wherein the user data includes one or more of data indicative of a user's current face and/or skin characteristics, face and/or skin preferences received as user input, a user's location, currently used cosmetic and/or skincare products, and usage trends for the currently used cosmetic and/or skincare products, and wherein portions of the user data are received from smart packaging devices, smart mirrors, fitness trackers, and environmental sensors.

6. The computer implemented method of claim 5, wherein the data indicative of the usage trends for the currently used cosmetic and/or skincare products includes data received from the smart packaging devices for the currently used cosmetic and/or skincare products, the data received from the smart packaging devices monitoring use of the currently used cosmetic and/or skincare products over time, expiration dates of the currently used cosmetic and/or skincare products, and storage conditions of the currently used cosmetic and/or skincare products.

7. The computer implemented method of claim 5, wherein the data indicative of the user's current face and/or skin characteristics includes one or multiple images of the user's face and/or skin, wherein the portion of the user data input into the trained artificial intelligence module includes the one or multiple images, wherein the trained artificial intelligence module identifies the plurality of unique face and/or skin characteristics from the one or multiple images of the user's face and/or skin, and wherein the historical data inputs include one or more images of skin and faces having the known face and/or skin characteristics.

8. The computer implemented method of claim 7, wherein the historical data inputs are first historical data inputs, the trained artificial intelligence module is a first trained artificial intelligence module, and wherein generating the at least one personalized recommendation based on the plurality of unique face and/or skin characteristics identified by the trained artificial intelligence module from the user data and the cosmetic and/or skincare products contained in the database includes:

receiving, via the one or more processors, the plurality of unique face and/or skin characteristics as an output from the first trained artificial intelligence module based upon the one or more images;

retrieving, via the one or more processors, an initial set of cosmetic and/or skincare products from the database based at least in part on the plurality of unique face and/or skin characteristics output from the first trained artificial intelligence module based upon the one or more images and the face and/or skin preferences received as user input;

inputting, via the one or more processors, the output from the first trained artificial intelligence module, the initial set of cosmetic and/or skincare products retrieved from the database, the face and/or skin preferences received as user input, the user's location, the currently used cosmetic and/or skincare products, and the usage trends for the currently used cosmetic and/or skincare products into a second trained artificial intelligence module, the second trained artificial intelligence module being trained using second historical data inputs that are associated with known product recommendations and known usage guidelines; and receiving, via the one or more processors, the at least one personalized recommendation as an output from the second trained artificial intelligence module.

9. The computer implemented method of claim 1, wherein the user device is a first user device, and further comprising:

receiving, at the one or more processors, a plurality of images of the user's face and/or skin during a time period when the recommended cosmetic and/or skincare product was being used;

inputting, via the one or more processors, the plurality of images into the trained artificial intelligence module;

receiving, via the one or more processors, a plurality of additional face and/or skin characteristics extracted from the plurality of images as an output from the trained artificial intelligence module based upon the one or more images;

comparing changes in the plurality of additional face and/or skin characteristics output from the trained artificial intelligence module over time to expected changes over time from use of the recommended cosmetic and/or skincare product; and transmitting a second notification documenting deviations from the expected changes over time for display on a second user device different from the first user device.

10. A computing system for generating personalized cosmetic and/or skincare product recommendations and usage guidelines, the computing system comprising:

one or more processors; and one or more memories having stored thereon computer-executable instructions that, when executed by the one or more processors, cause the computing system to:

receive user data at one or more processors, the user data being indicative of at least a plurality of unique face and/or skin characteristics associated with an individual user;

input at least a portion of the user data into a first trained artificial intelligence module, the first trained artificial intelligence module being trained using historical data inputs that are associated with known face and/or skin characteristics;

identify, via execution of the first trained artificial intelligence module, the plurality of unique face and/or skin characteristics from the user data input by the one or more processors;

retrieve an initial set of cosmetic and/or skincare products from a database based at least in part on the plurality of unique face and/or skin characteristics;

input the output from the first trained artificial intelligence module and the initial set of cosmetic and/or skincare products retrieved from the database into a second trained artificial intelligence module;

generate, via execution of the second trained artificial intelligence module, at least one personalized recommendation by processing the plurality of unique face and/or skin characteristics and the cosmetic and/or skincare products retrieved from the database, wherein:

the second trained artificial intelligence module is trained using second historical data inputs that are associated with known product recommendations and known usage guidelines, and the at least one personalized recommendation is for one of the cosmetic and/or skincare products retrieved from the database and includes associated usage guidelines; and transmit a notification of the at least one personalized recommendation for display on a user device.

11. The computing system of claim 10, wherein to train the first trained artificial intelligence module, the instructions cause the computing system to:

iteratively input the first historical data inputs into an initial artificial intelligence module, the first historical data inputs including one or more images of skin and faces having the known face and/or skin characteristics;

iteratively receive training outputs from the initial artificial intelligence module, the training outputs including face and/or skin characteristics extracted by the initial artificial intelligence module from the first historical data inputs;

iteratively update the initial artificial intelligence module based on comparisons between the training outputs and the known face and/or skin characteristics through multiple iterations; and store the initial artificial intelligence module in a memory as the first trained artificial intelligence module when the training outputs match the known face and/or skin characteristic in accordance with a reliability threshold, the reliability threshold being a threshold percentage number of the training outputs that match the known face and/or skin characteristic.

12. The computing system of claim 10, wherein to train the second trained artificial intelligence module, the instructions cause the computing system to:

iteratively inputting, via the one or more processors, the second historical data inputs into an initial artificial intelligence module, the second historical data inputs including pluralities of historical face and/or skin characteristics, historical sets of cosmetic and/or skincare products, and the known product recommendations and known usage guidelines;

iteratively receiving, via the one or more processors, training outputs from the initial artificial intelligence module, the training outputs including product recommendations and associated usage guidelines identified by the initial artificial intelligence module from the second historical data inputs;

iteratively updating, via the one or more processors, the initial artificial intelligence module based on comparisons between the training outputs and the known product recommendations and known usage guidelines; and saving, via the one or more processors, the initial artificial intelligence module in a memory as the second trained artificial intelligence module when the training outputs match the known product recommendations and known usage guidelines in accordance with a reliability threshold, the reliability threshold being a threshold percentage number of the training outputs that match the known product recommendations and known usage guidelines.

13. A non-transitory computer-readable medium having stored thereon computer-executable instructions that, when executed, cause one or more processors to:

receive user data indicative of at least a plurality of unique face and/or skin characteristics associated with an individual user;

input at least a portion of the user data into a first trained artificial intelligence module, the first trained artificial intelligence module being trained using historical data inputs that are associated with known face and/or skin characteristics;

identify, via execution of the first trained artificial intelligence module, the plurality of unique face and/or skin characteristics from the user data input by the one or more processors;

retrieve an initial set of cosmetic and/or skincare products from a database based at least in part on the plurality of unique face and/or skin characteristics;

input the output from the first trained artificial intelligence module and the initial set of cosmetic and/or skincare products retrieved from the database into a second trained artificial intelligence module;

generate, via execution of the second trained artificial intelligence module, at least one personalized recommendation by processing the plurality of unique face and/or skin characteristics and the cosmetic and/or skincare products contained in a retrieved from the database, wherein:

the second trained artificial intelligence module is trained using second historical data inputs that are associated with known product recommendations and known usage guidelines, and the at least one personalized recommendation is for one of the cosmetic and/or skincare products retrieved from the database and includes associated usage guidelines; and transmit a notification of the at least one personalized recommendation for display on a user device.

* * * * *